(12) United States Patent
Gratson et al.

(10) Patent No.: US 7,790,061 B2
(45) Date of Patent: Sep. 7, 2010

(54) DIRECTED ASSEMBLY OF THREE-DIMENSIONAL STRUCTURES WITH MICRON-SCALE FEATURES

(75) Inventors: Gregory Gratson, Urbana, IL (US); Jennifer A. Lewis, Urbana, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 671 days.

(21) Appl. No.: 11/560,610

(22) Filed: Nov. 16, 2006

(65) Prior Publication Data

US 2007/0228335 A1 Oct. 4, 2007

Related U.S. Application Data

(62) Division of application No. 10/463,834, filed on Jun. 17, 2003, now Pat. No. 7,141,617.

(51) Int. Cl.
*H01B 1/00* (2006.01)
*B29C 47/00* (2006.01)
*B29C 47/88* (2006.01)

(52) U.S. Cl. ............ 252/500; 264/177.13; 264/178 R (58) Field of Classification Search ............... 252/500; 264/177.13, 178 R
See application file for complete search history.

(56) References Cited

U.S. PATENT DOCUMENTS

| | | | |
|---|---|---|---|
| 2,892,797 A | 6/1959 | Alexander et al. | |
| 3,546,142 A * | 12/1970 | Michaels et al. | 521/27 |
| 3,878,034 A | 4/1975 | Bever et al. | |
| 4,137,217 A * | 1/1979 | Tsuchida et al. | 525/185 |
| 4,178,270 A | 12/1979 | Fujita | |
| 4,181,532 A | 1/1980 | Woodhead | |
| 4,410,457 A | 10/1983 | Fujimura et al. | |
| 4,414,354 A | 11/1983 | Slocombe | |
| 4,426,356 A | 1/1984 | Nair | |
| 4,446,174 A | 5/1984 | Nakamura et al. | |
| 4,471,100 A | 9/1984 | Tsubakimoto et al. | |
| 4,701,218 A | 10/1987 | Rowlands et al. | |
| 4,818,614 A | 4/1989 | Fukui et al. | |
| 4,946,904 A | 8/1990 | Akimoto et al. | |
| 4,960,465 A | 10/1990 | Arfaei | |
| 5,021,596 A | 6/1991 | Barfurth et al. | |

(Continued)

FOREIGN PATENT DOCUMENTS

AU    B-64095/80    9/1982

(Continued)

OTHER PUBLICATIONS

Sukhishvili et al., "Layered, Erasable, Ultrathin Polymer Films," J. Am. Chem. Soc., 2000, vol. 122, pp. 9550-9551.*

(Continued)

*Primary Examiner*—Mark Kopec
*Assistant Examiner*—Jaison P Thomas
(74) *Attorney, Agent, or Firm*—Brinks Hofer Gilson & Lione (57) ABSTRACT

The invention provides polyelectrolyte inks comprising a solvent, a cationic polyelectrolyte, dissolved in the solvent, and an anionic polyelectrolyte, dissolved in the solvent. The concentration of at least one of the polyelectrolytes in the solvent is in a semidilute regime.

23 Claims, 5 Drawing Sheets

U.S. PATENT DOCUMENTS

| | | | |
|---|---|---|---|
| 5,100,984 A | 3/1992 | Burge et al. | |
| 5,147,841 A | 9/1992 | Wilcoxon | |
| 5,196,199 A | 3/1993 | Fuisz | |
| 5,237,017 A | 8/1993 | Akiyama et al. | |
| 5,238,625 A | 8/1993 | Sakurai et al. | |
| 5,250,476 A | 10/1993 | Mogensen et al. | |
| 5,284,894 A | 2/1994 | Wasyliw et al. | |
| 5,344,487 A | 9/1994 | Whalen-Shaw | |
| 5,369,198 A | 11/1994 | Albrecht et al. | |
| 5,393,343 A | 2/1995 | Darwin et al. | |
| 5,416,071 A | 5/1995 | Igari et al. | |
| 5,424,362 A | 6/1995 | Hwang et al. | |
| 5,424,364 A | 6/1995 | Simms et al. | |
| 5,424,466 A | 6/1995 | Stern et al. | |
| 5,424,467 A | 6/1995 | Bam et al. | |
| 5,424,477 A | 6/1995 | Higuchi et al. | |
| 5,429,761 A | 7/1995 | Havelka et al. | |
| 5,516,836 A | 5/1996 | Sauer et al. | |
| 5,545,280 A | 8/1996 | Wenz | |
| 5,556,460 A | 9/1996 | Berke et al. | |
| 5,597,871 A | 1/1997 | Auschra et al. | |
| 5,607,892 A | 3/1997 | Chopin et al. | |
| 5,643,247 A | 7/1997 | Fernandez et al. | |
| 5,646,200 A | 7/1997 | Duncan | |
| 5,651,986 A | 7/1997 | Brem et al. | |
| 5,654,006 A | 8/1997 | Fernandez et al. | |
| 5,665,158 A | 9/1997 | Darwin et al. | |
| 5,753,037 A | 5/1998 | Drs et al. | |
| 5,753,261 A | 5/1998 | Fernandez et al. | |
| 5,800,922 A | 9/1998 | Anderson et al. | |
| 5,811,124 A | 9/1998 | Fernandez et al. | |
| 5,820,879 A | 10/1998 | Fernandez et al. | |
| 5,883,196 A | 3/1999 | Rath et al. | |
| 5,891,313 A | 4/1999 | Johnson et al. | |
| 5,957,828 A | 9/1999 | Hayashi | |
| 5,958,858 A | 9/1999 | Bettiol et al. | |
| 5,962,608 A | 10/1999 | Ryang et al. | |
| 6,008,181 A | 12/1999 | Cripe et al. | |
| 6,015,781 A | 1/2000 | Vinson et al. | |
| 6,020,303 A | 2/2000 | Cripe et al. | |
| 6,027,326 A | 2/2000 | Cesarano, III et al. | |
| 6,051,636 A | 4/2000 | Johnson et al. | |
| 6,060,443 A | 5/2000 | Cripe et al. | |
| 6,080,216 A | 6/2000 | Erickson | |
| 6,093,856 A | 7/2000 | Cripe et al. | |
| 6,103,868 A | 8/2000 | Heath et al. | |
| 6,107,409 A | 8/2000 | Hogan et al. | |
| 6,127,094 A | 10/2000 | Victor et al. | |
| 6,133,222 A | 10/2000 | Vinson et al. | |
| 6,133,227 A | 10/2000 | Barnabas et al. | |
| 6,136,333 A | 10/2000 | Cohn et al. | |
| 6,136,428 A | 10/2000 | Truong et al. | |
| 6,136,769 A | 10/2000 | Asano | |
| 6,139,623 A | 10/2000 | Darwin et al. | |
| 6,150,459 A | 11/2000 | Mayes et al. | |
| 6,153,577 A | 11/2000 | Cripe et al. | |
| 6,165,406 A | 12/2000 | Jang et al. | |
| 6,167,910 B1 | 1/2001 | Chow | |
| 6,207,749 B1 | 3/2001 | Mayes et al. | |
| 6,211,249 B1 | 4/2001 | Cohn et al. | |
| 6,228,217 B1 * | 5/2001 | Dickerson et al. | 162/158 |
| 6,228,829 B1 | 5/2001 | Vinson et al. | |
| 6,242,406 B1 | 6/2001 | Katsuda et al. | |
| 6,258,161 B1 | 7/2001 | Kerkar et al. | |
| 6,262,129 B1 | 7/2001 | Murray et al. | |
| 6,277,191 B1 | 8/2001 | Budiansky et al. | |
| 6,321,791 B1 | 11/2001 | Chow | |
| 6,379,974 B1 | 4/2002 | Parce et al. | |
| 6,395,804 B1 | 5/2002 | Gaddam et al. | |
| 6,436,167 B1 | 8/2002 | Chow et al. | |
| 6,441,054 B1 | 8/2002 | Ou et al. | |
| 6,451,433 B1 | 9/2002 | Oka et al. | |
| 6,465,257 B1 | 10/2002 | Parce et al. | |
| 6,471,761 B2 | 10/2002 | Fan et al. | |
| 6,499,499 B2 | 12/2002 | Dantsker et al. | |
| 6,517,199 B1 | 2/2003 | Tomioka et al. | |
| 6,572,673 B2 | 6/2003 | Lee et al. | |
| 6,595,232 B2 | 7/2003 | Guzman et al. | |
| 6,596,545 B1 | 7/2003 | Wagner et al. | |
| 6,599,647 B2 | 7/2003 | Oguri et al. | |
| 6,645,444 B2 | 11/2003 | Goldstein | |
| 6,670,415 B2 | 12/2003 | Jardine et al. | |
| 6,673,285 B2 | 1/2004 | Ma | |
| 6,746,510 B2 | 6/2004 | Kurihara et al. | |
| 6,861,205 B2 | 3/2005 | Bowman et al. | |
| 6,878,184 B1 | 4/2005 | Rockenberger et al. | |
| 6,929,675 B1 | 8/2005 | Bunge et al. | |
| 6,936,746 B2 * | 8/2005 | Effing et al. | 602/48 |
| 6,942,825 B2 | 9/2005 | Honda et al. | |
| 6,974,493 B2 | 12/2005 | Harutyunyan et al. | |
| 7,053,125 B2 | 5/2006 | Lewis et al. | |
| 7,081,322 B2 | 7/2006 | Ray et al. | |
| 7,141,617 B2 | 11/2006 | Gratson et al. | |
| 7,160,525 B1 | 1/2007 | Peng et al. | |
| 7,198,736 B2 | 4/2007 | Kasuga et al. | |
| 2001/0049912 A1 | 12/2001 | Motonari et al. | |
| 2002/0015846 A1 * | 2/2002 | Evans et al. | 428/373 |
| 2002/0016387 A1 | 2/2002 | Shen | |
| 2002/0121229 A1 | 9/2002 | Jardine et al. | |
| 2002/0147282 A1 | 10/2002 | Mayes et al. | |
| 2002/0182171 A1 | 12/2002 | Detert et al. | |
| 2002/0195747 A1 | 12/2002 | Hull et al. | |
| 2003/0032727 A1 | 2/2003 | Narayan-Sarathy et al. | |
| 2003/0091647 A1 | 5/2003 | Lewis et al. | |
| 2003/0162004 A1 | 8/2003 | Mirkin et al. | |
| 2003/0177690 A1 | 9/2003 | Wittkowski et al. | |
| 2004/0076822 A1 * | 4/2004 | Jagota et al. | 428/364 |
| 2004/0096469 A1 | 5/2004 | Lewis et al. | |
| 2004/0161544 A1 | 8/2004 | Kasperchik | |
| 2004/0226620 A1 | 11/2004 | Therriault et al. | |
| 2005/0004261 A1 | 1/2005 | Yatake | |
| 2005/0189520 A1 | 9/2005 | Okada et al. | |
| 2005/0196605 A1 | 9/2005 | Ramsey | |
| 2006/0235105 A1 | 10/2006 | Gratson et al. | |
| 2006/0239902 A1 | 10/2006 | Kimura et al. | |
| 2007/0172588 A1 | 7/2007 | Therriault et al. | |
| 2007/0228335 A1 | 10/2007 | Gratson et al. | |
| 2008/0245266 A1 | 10/2008 | Lewis et al. | |
| 2009/0000678 A1 | 1/2009 | Therriault et al. | |

FOREIGN PATENT DOCUMENTS

| | | |
|---|---|---|
| DE | 2052749 | 5/1972 |
| EP | 362770 | 4/1990 |
| EP | 362770 A2 | 4/1990 |
| EP | 0 263 490 B1 | 1/1995 |
| GB | 2094820 A | 9/1982 |
| WO | WO 97/19711 | 6/1997 |
| WO | WO 97/19711 A1 | 6/1997 |
| WO | WO 99/51335 | 10/1999 |
| WO | WO 00/47628 A | 8/2000 |
| WO | WO 01/89787 A2 | 11/2001 |
| WO | WO 02/20627 A | 3/2002 |
| WO | WO/2004/043853 | 5/2004 |
| WO | WO 2005/000977 | 1/2005 |

OTHER PUBLICATIONS

Laarz, E. et al., "The Effect of Anionic Polyelectrolytes on the Properties of Aqueous Silicon Nitride Suspensions", J. of European Ceramic Society, vol. 20, pp. 431-440, 2000.*

Lewis J. A. et al., "Direct Writing in Three Dimensions", Materials Today, pp. 32-29, (2004).*

Li, C. et al., "Effect of a Comb-like Amphiphilic Polymer on the Stability of Alumina Dispersions", Colloids and Surfaces, 69, pp. 155-158, 1992.*

Li, Q. et al., "Nanoparticle Inks for Directed Assembly of Three-Dimensional Periodic Structures", Advanced Materials, vol. 15, pp. 1639-1643, 2003.*

Liu et al., "Novel Template Guided Synthesis of Polyaniline," Mat. Res. Soc. Symp. Proc. vol. 247, pp. 601-606 (1992).*

Seet, K.K. et al., "Three-dimensional spiral-architecture photonic crystals obtained by direct laser writing", Advanced Materials, vol. 17, No. 5, pp. 541-545, (2005).

Morissette, S.L. et al., "Solid freeform fabrication of aqueous alumina-poly(vinyl alcohol) gelcasting suspensions", Journal of the American Ceramic Society, vol. 83, No. 10, pp. 2409-2416, (2000).

Morrissette, S.L. et al., "Chemorheology of aqueous-based alumina-poly(vinyl alcohol) gelcasting suspensions", Journal of the American Ceramic Society, vol. 82, No. 3, pp. 521-528, (1999).

Kozuka H. et al., "Crack-free thick ceramic coating films via non-repetitive dip-coating using polyvinylpyrrolidone as stress-relaxing agent", Journal of Sol-Gel Science and Technology, vol. 19, pp. 205-209, (2000).

DuPont Tyzor Organic Titanates General Brochure found at http://www.dupont.com/tyzor, 12 pages, (2001).

Duoss, E.B. et al, "Sol-gel inks for direct-write assembly of functional oxides", Adv. Mater, vol. 19, pp. 3485-3489, (2007).

Weeks, E.R. et al., "Three-Dimensional Direct Imaging of Structural Relaxation Near the Colloidal Glass Transition", Science, vol. 287, pp. 627-631, (2000).

Manley, S. et al., "Glasslike Arrest in Spinodal Decomposition as a Route to Colloidal Gelation", Phys. Rev. Lett., 95, Art. No. 238302, pp. 238302-1 thru 23802-4, (2005).

Trappe, V. et al., "Jamming phase diagram for attractive particles", Nature, vol. 411, pp. 772-775, (2001).

Anderson, V.J. et al., "Insights into phase transition kinetics from colloid science", Nature, vol. 416, pp. 811-815, (2002).

Lewis, J.A., Colloidal Processing of Ceramics. J. Am. Ceram. Soc., 83, (10), pp. 2341-2359, (2000).

Martinez, C.J. et al., "Shape Evolution and Stress Development During Latex-Silica Film Formation", Langmuir, 18, pp. 4689-4698, (2002).

Fichtner, M. et al., "Small Ti clusters for catalysis of hydrogen exchange in NaAlH4. Nanotechnology", 14, (7), pp. 778-785, (2003).

Kim, A.S. et al, "Cake resistance of aggregates formed in the diffusion-limited-cluster-aggregation (DLCA) regime", J. Membrane Science, 286, pp. 260-268, (2006).

Weitz, D.A. et al., "Fractal Structures Formed by Kinetic Aggregation of Aqueous Gold Colloids", Phys. Rev. Lett., 52, pp. 1433-1436, (1984).

Carpineti, M. et al., "Transition from Semiorder to Disorder in the Aggregation of Dense Colloidal Solutions", Phys. Rev. Lett., 70, (24), pp. 3828-3830, (1993).

Chen, M. et al., "Characteristics of Flocculated Silica Dispersions", J. Colloid Interface Sci., 141, pp. 564-577, (1991).

Varadan, P. et al., "Direct visualization of long range structural heterogeneity in colloidal gels", Langmuir, 19, pp. 509-512 (2003).

Hütter, M., "Local Structure Evolution in Particle Network Formation Studied by Brownian Dynamics Simulation", J. Colloid and Interface Sci., 231, pp. 337-350, (2000).

Dinsmore, A.D. et al., "Microscopic Structure and Elasticity of Weakly Aggregated Colloidal Gels", Phys. Rev. Lett., 96, Art. No. 185502, pp. 185502-1 thru 185502-4, (2006).

Ramakrishnan, S. et al. "Microstructure and Rheology of Thermoreversible Nanoparticle Gels", Langmuir, 22, pp. 7833-7842, (2006).

Ramakrishnan, S. et al., "Clustering and mechanics in dense depletion and thermal gels", Langmuir, 21, pp. 9917-9925, (2005).

Chung, B. et al. "Microscopic Dynamics of Recovery in Sheared Depletion Gels", Phys. Rev. Lett., 96, Art. No. 228301, pp. 228301-1 thru 228301-4, (2006).

Krell, A.H. et al., "Internal Dynamics and Elasticity of Fractal Colloidal Gels", Phys. Rev. Lett., 80, (4), pp. 778-781, (1998).

Weeks, E.R. et al., "Properties of cage rearrangements observed near the colloidal glass transition", Phys. Rev. Lett., 89, (Art. No. 095704), pp. 095704-1 thru 095704-4, (2002).

Puertas, A.M. et al., "Dynamical heterogeneities close to a colloidal gel", J. Chem. Phys., 121, (6), pp. 2813-2822, (2004).

Puertas, A.M. et al., "Mode Coupling and Dynamical Heterogeneity in Colloidal Gelation A Simulation Study", J. Phys. Chem. B, 109, pp. 6666-6675, (2005).

Kegel, W.K. et al., "Direct Observation of Dynamical Heterogeneities in Colloidal Hard-Sphere Suspensions", Science, 287, pp. 290-293, (2000).

Crocker, J.C., "Methods of Digital Video Microscopy for Colloidal Studies", J. Colloid and Interface Sci., 179, pp. 298-310, (1996).

Dinsmore, A.D. et al., "Direct imaging of three-dimensional structure and topology of colloidal gels", J. Phys. Cond. Matter, 14, pp. 7581-7597, (2002).

Dibble, C.J. et al., "Structure and dynamics of colloidal depletion gels: Coincidence of transitions and heterogeneity", Phys. Rev. E., 74, Art. No. 041403, pp. 041403-1 thru 041403-11 (2006).

Leunissen, M.E. et al. "Ionic colloidal crystals of oppositely charged particles", Nature, 437, (8), pp. 235-240, (2005).

Van Blaaderen, A. et al., "Template-directed colloidal crystallization", Nature, 385, pp. 321-324, (1997).

Lee, W. et al., "Nanoparticle-Mediated Epitaxial Assembly of Colloidal Crystals on Patterned Substrates", Langmuir, 20, pp. 5262-5270, (2004).

Solomon, T. et al., "Stacking fault structure in shear-induced colloidal crystallization", J. Chem Phys., 124, Art. No. 134905, pp. 134905-1 thru 134905-10, (2006).

Schall, P. et al., "Visualization of Dislocation Dynamics in Colloidal Crystals", Science, 305, pp. 1944-1948, (2004).

Mohraz, A. et al., "Direct Visualization of Colloidal Rod Assembly by Confocal Microscopy", Langmuir, 21, pp. 5298-5306, (2005).

Pham, K.N. et al., "Multiple Glassy States in a Simple Model System", Science, 296, pp. 104-106, (2002).

Segre, P.N.; "Glasslike kinetic arrest at the colloidal-gelation transition", Phys. Rev. Lett., 86, (26), pp. 6042-6045, (2001).

Scheidler, P. et al., "Cooperative motion and growing length scales in supercooled confined liquids", Europhys. Letters, 59 (5), pp. 701-707, (2002).

Kim, K. et al., "Apparent finite-size effects in the dynamics of supercooled liquids", Phys. Rev. E, 61, (1), pp. R41-R44, (2000).

Malek, K. et al., "Effects of surface roughness on self- and transport diffusion in porous media in the Knudsen regime", Phys. Rev. Lett., 87, (12), Art. No. 125505, pp. 125505-1 thru 125505-4, (2001).

Elimelech, M. et al., "Kinetics of Deposition of Colloidal Particles in Porous Media", Environmental Science and Technology, 24, pp. 1528-1536, (1990).

Bogush, G.H. et al., "Preparation of monodisperse silica particles: Control of size and mass fraction", Journal of Non-Crystalline Solids, 104, pp. 95-106, (1988).

van Blaaderen, A. et al., "Synthesis and Characterization of Colloidal Dispersions of Fluorescent, Monodisperse Silica Spheres", Langmuir, 8, pp. 2921-2931, (1992).

Dinsmore, A.D. et al. "Three-dimensional confocal microscopy of colloids", Appl. Opt., 40, (24), pp. 4152-4159, (2001).

Baxter, R.J., "Percus-Yevick equation for hard spheres with surface adhesion", J. Chem. Phys. 49, pp. 2770-2774, (1968).

Shih, W-H, et al., "Scaling behavior of the elastic properties of colloidal gels", Phys. Rev. A, 42, (8), pp. 4772-4779, (1990).

de Rooij, R. et al., "Elasticity of weakly aggregating polystyrene latex dispersions", Phys. Rev. E, 49, (4), pp. 3038-3049, (1994).

Potanin, A.A. et al., "Microrheological modeling of weakly aggregated dispersions", J. Chem. Phys., 102, (14), pp. 5845-5853, (1995).

Wolthers, W. et al. "Linear viscoelastic behavior of aggregated colloidal dispersions", Phys. Rev. E, 56, (5), pp. 5726-5733, (1997).

Mellema, M. et al., "Categorization of rheological scaling models for particle gels applied to casein gels", J. Rheol., 46, (1), pp. 11-29, (2002).

Mohraz, A. et al, "Orientation and rupture of fractal colloidal gels during start-up of steady shear flow", J. Rheology, 49, (3), pp. 657-681, (2005).

Eckert, T. et al., "Re-entrant Glass Transition in a Colloid-Polymer Mixture with Depletion Attractions", Phys. Rev. Lett., 89, (12), Art. No. 125701, pp. 125701-1 thru 125701-4, (2002).

Kirby H.K. et al., "Poly(acrylic acid)-poly(ethylene oxide) comb polymer effects on BaTiO3 nanoparticle suspension stability", J. Am. Ceram. Soc., 87, (2), pp. 181-186, (2004).

Li, Q. et al., "Nanoparticle inks for directed assembly of three-dimensional periodic structures", Adv. Mater., 15, (19), pp. 1639-1643, (2003).

D.H. Napper, "Polymeric Stabilization of Colloidal Dispersions", Academic Press, pp. 28-30, (1983).

Zukoski C.F., "Material properties and the electrorheological response", Annu. Rev. Mater. Sci., 23, pp. 45-78, (1993).

Lewis, J.A. et al., "Direct Ink Writing of Three-Dimensional Ceramic Structures", J. Am. Ceram. Soc., 89 [12], pp. 3599-3609, (2006).

Mohraz, A. et al., "Structure and Dynamics of Biphasic Colloidal Mixtures", Phys. Rev. E, 77, Art No. 060403(R), pp. 060403-1 thru 060403-4, (2008).

Croucher, M. et al., "Selective Flocculation in Heterosterically Stabilised Nonaqueous Dispersions", Colloids and Surfaces, 1, pp. 349-360, (1980).

Rao, R. et al., Abstract of Biphasic Nanoparticle Inks for the Direct Writing of 3D Ceramic Structures, Department of Materials Science and Engineering, Univer. Of Ill. at Urbana-Champaign, 1 page, (2006).

Whitby, C.P. et al., "PAA/PEO comb polymer effects on rheological properties and interparticle forces in aqueous silica suspensions", J. of Colloid and Interface Science, 262, pp. 274-281, (2003).

Duoss, E.B. et al., "Sol-Gel Inks for Direct-Write Assembly of Functional Oxides", Advanced Materials, 19, pp. 3485-3489, (2007).

Ryu, B-H. et al., "Synthesis of highly concentrated silver nanosol and its application to inkjet printing", Colloids and Surfaces A: Physicochem. Eng. Aspects, 270-71, pp. 345-351, (2005).

Xu, X. et al., "γ-Radiation synthesis of poly(acrylic acid)-metal nanocomposites", Materials Letters, 37, pp. 354-358, (1998).

Magdassi, S. et al., "Silver Nanoparticles as Pigments for Water-Based Ink-Jet Inks", Chem. Mater., 15, pp. 2208-2217, (2003).

Wang, W. et al., "Silver Nanoparticles Capped by Long-Chain Unsaturated Carboxylates", J. Phys. Chem. B, 103, pp. 7238-7246, (1999).

Jana, N.R. et al., "Single-Phase and Gram-Scale Routes toward Nearly Monodisperse Au and Other Noble Metal Nanocrystals", J. Am. Chem. Soc., 125, pp. 14280-14281, (2003).

Lin, X.Z. et al. "Direct Synthesis of Narrowly Dispersed Silver Nanoparticles Using a Single-Source Precursor", Langmuir, 19, pp. 10081-10085, (2003).

Wu, R-T. et al., "Preparation of highly concentrated and stable suspensions of silver nanoparticles by an organic base catalyzed reduction reaction", Materials Research Bulletin, 43, pp. 1276-1281, (2008).

Yamamoto, M. et al., "Size-Controlled Synthesis of Monodispersed Silver Nanoparticles Capped by Long-Chain Alkyl Carboxylates from Silver Carboxylate and Tertiary Amine", Langmuir, 22, pp. 8581-8586, (2006).

Fuller, S.B. et al., "Ink-Jet Printed Nanoparticle Microelectromechanical Systems", Journal of Microelectromechanical Systems, 11, pp. 54-60, (2002).

Kim, D. et al., "Direct writing of silver conductive patterns: Improvement of film morphology and conductance by controlling solvent compositions", Applied Physics Letters, 89, pp. 264101-1 thru 264101-3, (2006).

Perelaer, J. et al., "Ink-jet Printing and Microwave Sintering of Conductive Silver Tracks", Advanced Materials, 18, pp. 2101-2104, (2006).

Moon, K-S. et al., "Thermal Behavior of Silver Nanoparticles for Low-Temperature Interconnect Applications", J. Electronic Materials, 34, pp. 168-175, (2005).

Chou, K-S. et al., "Fabrication and sintering effect on the morphologies and conductivity of nano-Ag particle films by the spin coating method", Nanotechnology, 16, pp. 779-784, (2005).

Jones, J. et al., "Stretchable Wavy Metal Interconnects", J. Vacuum Sci. Technol. A, 22, pp. 1723-1725, (2004).

Khang, D-Y. et al., "A Streatchable Form of Single-Crystal Silicon for High Performance Electronics on Rubber Substrates", Science, 311, pp. 208-212, (2006).

Shiraishi, Y. et al., "Oxidation of ethylene catalyzed by colloidal dispersions of poly(sodium acrylate)-protected silver nanoclusters", Colloids and Surfaces A: Physicochemical and Engineering Aspects, 169, pp. 59-66, (2000).

Chapman, R. et al., "Electro-optical shifts in silver nanoparticle films", Chemical Physics Lett., 349, pp. 358-362, (2001).

Pastoniza-Santos, I. et al., "Formation and Stabilization of Silver Nanoparticles through Reduction by N,N-Dimethylformamide", Langmuir, 15, pp. 948-951, (1999).

Cliffel, D.E. et al., "Mercaptoammonium-Monolayer-Protected, Water-Soluble Gold, Silver, and Palladium Clusters", Langmuir, 16, pp. 9699-9702, (2000).

Kuo, P-L. et al., "Formation of Silver Nanoparticles under Structured Amino Groups in Pseudo-dendritic Poly(allylamine) Derivatives", J. Phys. Chem. B, 107, pp. 11267-11272, (2003).

Pal, T. et al., "Reversible Formation and Dissolution of Silver Nanoparticles in Aqueous Surfactant Media", Langmuir, 13, pp. 1481-1485, (1997).

Prasad, B.L.V. et al., "Solvent-Adaptable Silver Nanoparticles", Langmuir, 21, pp. 822-826, (2005).

Chang, J.S. et al., "Optimization of Nanosized Silver Particle Synthesis via Experimental Design", Ind. Eng. Chem. Res., 46, pp. 5591-5599, (2007).

Pyatenko, A. et al., "Synthesis of Spherical Silver Nanoparticles with Controllable Sizes in Aqueous Solutions", J. Phys. Chem. C, 111, pp. 7910-7917, (2007).

Slistan-Grijalva, A. et al., "Synthesis of silver nanoparticles in a polyvinylpyrrolidone (PVP) paste, and their optical properties in a film and in ethylene glycol", Materials Research Bulletin, 43, pp. 90-96, (2008).

Park, J-U. et al., "High-resolution electrohydrodynamic jet printing", Nature Materials, 6, pp. 782-789, (2007).

Gratson, G.M. et al., "Direct writing of three-dimensional webs", Nature, 428, p. 386, (2004).

Toshima, N. et al., "Effect of additional metal ions on catalyses of polymer-stabilized metal nanoclusters", J. of Molecular Catalysis A: Chemical, 177, pp. 139-147, (2001).

Campbell et al., "Fabrication of Photonic Crystals for the Visible Spectrum by Holographic Lithography," Nature, 2000, pp. 53-56, vol. 404.

Caruso et al., "Nanoengineering of Inorganic and Hybrid Hollow Spheres by Colloidal Templating," Science, 1998, pp. 1111-1114, vol. 282.

Cassagneau et al., "Conjugated Polymer Inverse Opals for Potentiometric Biosensing," Adv. Mat., 2002, pp. 1837-1841, vol. 14.

Chen et al., "Geometric Control of Cell Life and Death," Science, 1997, pp. 1425-1428, vol. 276.

Chrisey et al., Material Processing: The Power of Direct Writing, Science, 2000, 5 pages, vol. 289.

Clark et al., "Creating Microstructures of Luminescent Organic Think Films Using Layer-by-Layer Assembly," Adv. Mat., 1999, pp. 1031-1035, vol. 11.

Cumpston et al., "Two-Photon Polymerization Initiators for Three-Dimensional Optical Data Storage and Microfabrication," Nature, 1999, pp. 51-54, vol. 398.

Decher, "Fuzzy Nanoassemblies: Toward Layered Polymeric Multicomposites," Science, 1997, pp. 1232-1237, vol. 277.

Demers et al., "Direct Patterning of Modified Oligonucleotides on Metals and Insulators by Dip-Pen Nanolithography," Science, 2002, pp. 1836-1838, vol. 296.

Feiertag et al., "Fabrication of Photonic Crystals by Deep X-Ray Lithography," App. Phys. Lett., 1997, pp. 1441-1443, vol. 71.

Fery et al., "Nanoporous Thin Films Formed by Salt-Induced Structural Changes in Multilayers of Poly(acrylic Acid) and Poly(allylamine)," Langmuir, 2001, pp. 3779-3783, vol. 17.

Jiang et al., "Exploring the Rules for Selective Deposition: Interactions of Model Polyamines on Acid and Oligoethylene Oxide Surfaces," Langmuir, 2002, pp. 1131-1143, vol. 18.

Jiang et al., "Polymer-On-Polymer Stamping: Universal Approaches to Chemically Patterned Surfaces," Langmuir, 2002, pp. 2607-2615, vol. 18.

Foresi et al., "Photonic-Bandgap Microcavities in Optical Waveguides," Nature, 1997, pp. 143-145, vol. 390.

Kiriy et al., "Cascade of Coil-Globule Conformational Transitions of Single Flexible Polyelectrolyte Molecules in Poor Solvent," J. Am. Chem. Soc., 2002, pp. 13454-13462, vol. 124.

Landers et al., "Rapid Prototyping of Scaffolds Derived from Thermoreversible Hydrogels and Tailored for Applications in Tissue Engineering," Biomaterials, 2002, pp. 4437-4447, vol. 23.

Lazaris et al., "Spider Silk Fibers Spun from Soluble Recombinant Silk Produced in Mammalian Cells," Science, 2002, pp. 472-476, vol. 295.

Lee et al., "Multi-Photon Polymerization of Waveguide Structures Within Three-Dimensional Photonic Crystals," Adv. Mat., 2002, pp. 271-274, vol. 14.

Lewis, "Direct-Write Assembly of Ceramics from Colloidal Inks," Curr. Opin. Solid State Mat. Sci., 2002, pp. 245-250, vol. 6.

Lin et al., "A Three-Dimensional Photonic Crystal Operating at Infrared Wavelengths," Nature, 1998, pp. 251-253, vol. 394.

Meier-Haack et al., "Pervaporation Separation of Water/Alcohol Mixtures Using Composite Membranes Based on Polyelectrolyte Multilayer Assemblies," J. Membr. Sci., 2001, pp. 233-243, vol. 184.

Noda et al., "Full Three-Dimensional Photonic Bandgap Crystals at Near-Infrared Wavelengths," Science, 2000, pp. 604-606, vol. 289.

Piner et al., ""Dip-Pen" Nanolithography," Science, 1999, pp. 661-663, vol. 283.

Seidel et al., "Artificial Spinning of Spider Silk," Macromolecules, 1998, pp. 6733-6736, vol. 31.

Smay et al., "Directed Colloidal Assembly of 3D Periodic Structures," Adv. Mat., 2002, pp. 1279-1283, vol. 14.

Smay et al., "Colloidal Inks for Directed Assembly of 3-D Periodic Structures," Langmuir, 2002, pp. 5429-5437, vol. 18.

Vlasov et al., "On-Chip Natural Assembly of Silicon Photonic Bandgap Crystals," Nature, 2001, pp. 289-293, vol. 414.

Vollrath et al., "Liquid Crystalline Spinning of Spider Silk," Nature, 2001, pp. 541-548, vol. 410.

Wu et al., "Fabrication of Complex Three-Dimensional Microchannel Systems in PDMS," J. Am. Chem. Soc., 2003, pp. 554-559, vol. 125.

Xia et al., "Soft Lithography," Angew. Chem. Int. Ed., 1998, pp. 550-575, vol. 37.

Zezin et al., "A New Class of Complex Water-Soluble Polyelectrolytes," Russ. Chem. Rev., 1982, pp. 833-855, vol. 51.

ADVA® Flow Superplasticizer ASTM C494, Type F (carboxylated polyether) with Material Safety Data Sheet (MSDS), Grace Construction Products 10 p., Nov. 13, 2002.

Anderson, J.R., et al., "Fabrication of Topologically Complex Three-Dimensional Microfluidic Systems in PDMS by Rapid Prototyping", Anal. Chem. 72, pp. 3158-3164, 2000.

Aref, H., "The Development of Chaotic Advection", Phys. Fluids 14, pp. 1315-1325, 2002.

Axim Italcementi Group, Catexol™ Superflux 2000 PC, with Material Safety Data Sheet (MSDS), 7 p., Nov. 13, 2002.

Bautista, F. et al., "Understanding Thixotropic and Antithixotropic Behavior of Viscoelastic Micellar Solutions and Liquid Crystalline Dispersions. I. The Model." Journal of Non-Newtonian Fluid Mechanics, vol. 80, pp. 93-113, 1999.

Bell, Nelson, et al., "Cation-Induced Collapse of Low-Molecular-Weight Polyacrylic Acid in the Dispersion of Barium Titanate", Journal of Colloid and Interface Science 254, pp. 296-305, 2002.

Berg, J.M., et al., "Interactions between Mica Surfaces in Sodium Polyacrylate Solutions Containing Calcium Ions", Journal of Colloid and Interface Science, 161, pp. 182-189, 1993.

Breitenbach, A., et al. "Branched biodegradable polyesters for parenteral drug delivery systems", Journal of Controlled Release, vol. 64, pp. 167-178, 2000.

Burns, M.A., et al., "An Integrated Nanoliter DNA Analysis Device" Science 282, pp. 484-487, 1998.

Cesarano III, Joseph et al., "Processing of Highly Concentrated Aqueous α-Alumina Suspensions Stabilized with Polyelectrolytes", J. Am. Ceram. Soc., vol. 71 No. 12, pp. 1062-1067, 1988.

Cesarano III, Joseph, et al., "Stability of Aqueous $\alpha$-$Al_2O_3$ Suspensions with Poly(methacrylic acid) Polyelectrolyte", J. Am. Ceramic Soc., vol. 7, No. 4, pp. 250-255, 1988.

Chabinyc, M.L., et al., "An Integrated Fluorescence Detection System in Poly(dimethylsiloxane) for Microfluidic Applications" Anal. Chem. 73, pp. 4491-4498, 2001.

Abstract of Sakai et al., "Influence of various types of inorganic salts on dispersion mechanisms of comb-type polymer containing grafted polyethylene oxides chains," Journal of the Ceramic Society of Japan, vol. 108, No. 10, pp. 904-908, 2000.

Choi, J.W., et al., "An Active Microfluidic Mixer for Mixing of Microparticles and Liquids"; SPIE Proceedings 4177, The International Society for Optical Engineering, pp. 154-161, 2000.

Chou, H.P., et al., "A Microfabricated Device for Sizing and Sorting DNA Molecules", Proc. Natl. Acad. Sci. 96, pp. 11-13, 1999.

Dahlgren, M., "Effect of Counterion Valency and Ionic Strength on Polyelectrolyte Adsorption" Langmuir vol. 10, No. 5, pp. 1580-1583, 1994.

De L. Costello, et al., "Experimental investigations of the interaction forces in concentrated dispersions", Colloids and Surfaces A: Physiochemical and Engineering Aspects, 77, pp. 55-63, 1993.

Fan, H., "Rapid Prototyping of Patterned Functional Nanostructures," Nature, vol. 405, pp. 56-60, 2000.

Hadjichristidis, N., "Polymers with Complex Architecture by Living Anionic Polymerization", Chem. Rev. vol. 101, pp. 3747-3792, 2001.

Jacoby, Mitch, 3-D Structures From Stable Gels:, Chemical & Engineering News, vol. 80, No. 26, p. 7, Jul. 1, 2002.

Jeon, N.L., et al., "Generation of Solution and Surface Gradients Using Microfluidic Systems", Langmuir 16, pp. 8311-8316, 2000.

Jones, S.W., "Interaction of Chaotic Advection and Diffusion", Chaos Applied to Fluid Mixing, Aref, H. and El Naschie, M.S., eds., pp. 185-196, 1995.

Kenny, Jack, "Digital Printing: The Excitement Grows", www.labelandnarrowweb.com, pp. 1-5, Nov. 2000.

Kenny, Jack, "Specialty Ink", www.labelandnarrowweb.com, pp. 1-4, Sep. 2003.

Label & Narrow Web, "Specialty Inks", pp. 1-14., Nov. 2000.

Li, C., et al., "Effect of a comb-like amphiphilic polymer on the stability of alumina dispersions", Colloids and Surfaces, 69, pp. 155-158, 1992.

Li, Chia-Chen, et al., "Interaction between Dissolved Ba2+ and PAA-NH4 Dispersant in Aqueous Barium Titanate Suspensions", Journal of the American Ceramic Society, vol. 85, No. 6, pp. 1449-1455, 2002.

Loctite Corporation Prussian Blue, Material Safety Data Sheet dated Jan. 6, 2002, 5 pages; http://www.loctite.com/datasheets/msds/30520.html, Jan. 14, 2002.

Loctite® Product Description Sheet Prussian Blue, Maintenance, Repair & Operations, 1p, Jan. 1999.

Losey, M.W., et al., "Microfabricated Multiphase Packed-Bed Reactors: Characterization of Mass Transfer and Reactions", Ind. Eng. Chem. Res. 40, pp. 2555-2562, 2001.

Mas, R., et al., "Rheology of Colloidal Suspensions: Case of Lubricating Greases," Journal of Rheology, vol. 38, No. 4, pp. 889-908, 1994.

Moore, S.K., "Microfluidics for Complex Computation", IEEE Spectrum 38, pp. 28-29, 2001.

Napper, Donald H., "Polymeric Stabilization of Colloidal Dispersions" Academic Press, Inc., pp. 28-30, 1983.

Orgeret-Ravanat, C. et al., "Adsorption/Desorption of a PEO-rich Comb-like Polymer at a Silica/Aqueous Solution Interface", Colloids and Surfaces vol. 33, pp. 109-119, 1988.

Polymer Source, Inc., Information Sheet—Custom Synthesis, comb polymer (poly(acrylic acid) backbone and poly(ethylene oxide) teeth), 2 p., Nov. 13, 2002.

Reed, James S., "Principles of Ceramic Processing", $2^{nd}$ Ed., John Wiley & Sons, Inc., pp. 525-541, 1995.

Sakai, E., et al., "Dispersion Mechanisms of Comb-Type Superplasticizers Containing Grafted Poly(ethylene oxide) Chains", Macromol. Symp. 175, pp. 367-376, 2001.

Schwartz, Steven A., "Gypsum Dispersing Agents", Lyondell Chemical Company, pp. 1-10, 2002.

Silkroad C&T:Admixtures for Concrete, PEMA-200N, Product Information Sheet, 2 p., Nov. 13, 2002.

Smay, James E., et al., "Colloidal Inks for Directed Assembly of 3-D Periodic Structures", Langmuir, pp. 5429-5437, vol. 18, No. 14, 2002.

Stenius, P. et al., "Aggregation in concentrated kaolin suspensions stabilized by polyacrylate", Colloids and Surfaces, vol. 51, pp. 219-238, 1990.

Stromberg, A., et al., "Microfluidic Device for Combinatorial Fusion of Liposomes and Cells", Anal. Chem. 73, pp. 126-130 2001.

Takemoto Oil & Fat Co. Ltd. Product Information Sheet, 2 p., Nov. 13, 2002.

Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002.

Uhrig, D., et al., "Synthesis of Combs, Centipedes, and Barbwires: Poly(isoprene-graft-styrene) Regular Multigraft Copolymers with Trifunctional, Tetrafunctional, and Hexafunctional Branch Points", Macromolecules vol. 35, pp. 7182-7190, 2002.

Vermohlen, K., et al., "Adsorption of polyelectrolytes onto oxides—the influence of ionic strength, molar mass, and Ca2+ ions", Colloids and Surfaces A: Physicochem. Eng. Aspects 163, pp. 45-53, 2000.

White, S.R., et al., "Autonomic Healing of Polymer Composites", Nature 409, pp. 794-797, 2001.

Allahyarov, E. et al., "Attraction between Like-Charged Macroions by Coulomb Depletion", Physical Review Letters, vol. 81, No. 6, pp. 1334-1337, 1998.

Allahyarov, E. et al., "Effective forces between macroions: The cases of asymmetric macroions and added salt", Physical Review E, vol. 57, No. 5, pp. 5818-5824, 1998.

BIC, "Zeta Potential Applications", article from the Internet, http://www.bic.comfZetaPotentialApplications.htm>, 4 pages, printed Sep. 14, 2001.

Braun, Paul V. et al., "Electrochemical Fabrication of 3D Microperiodic Porous Materials", Advanced Materials, vol. 13, No. 7, pp. 482-485, 2001.

Braun, Paul V. et al., "Electrochemically grown photonic crystals", Nature, vol. 402, pp. 603-604, 1999.

Braun, Paul V. et al., "Optical spectroscopy of high dielectric contrast 3D photonic crystals", Europhys. Lett., vol. 56, pp. 207-213, 2001.

CAMP Annual Report 2000, "Colloidal Dispersions and Processing", Center for Advanced Materials Processing, 2000, article from the Internet, http://www.clarkson.edu/camp/annual_report/page6.htm>, 2 pages, printed Sep. 14, 2001.

Ferreira, Paula G. et al., "Mixtures of charged colloids and nonadsorbing flexible polyelectrolytes: An integral equation study", J. Chem. Phys., vol. 113, No. 21, pp. 9849-9862, 2000.

Garibay-Alonso, R. et al., "Phase separation of binary liquid mixtures of hard spheres and Yukawa particles", Physica A, vol. 235, pp. 159-169, 1997.

Malvern, "The use of the Malvern Zetasizer for the measurement of Zeta Potential", article from the Internet, http://www.malvern.co.alLaboratory/zetaintm.htm>, 10 pages, printed on Feb. 12, 2002.

Malvern, "Zeta Potential Theory, Dispersion stability", article from the Internet, http://www.malvern.co.uk/Laboratory/zettheo.htm>, 3 pages, printed on Feb. 12, 2002.

Mendez-Alcaraz, J.M. et al., "Depletion forces in colloidal mixtures", Physical Review E, vol. 61, No. 4, pp. 4095-4099, 2000.

Mendez-Alcaraz, J.M. et al., "Structural properties of colloidal suspensions", Physica A, vol. 220, pp. 173-191, 1995.

Mendez-Alcaraz, J.M. et al., "Structure of Binary Colloidal Mixtures of Charged and Uncharged Spherical Particles", Langmuir, vol. 8, pp. 2913-2920, 1992.

Nguyen, T. T. et al., "Macroions in Salty Water with Multivalent Ions: Giant Inversion of Charge", Physical Review Letters, vol. 85, No. 7, pp. 1568-1571, 2000.

Ramakrishnan, S. et al., "Characterizing nanoparticle interactions: Linking models to experiments", J. Chem. Phys., vol. 113, No. 3, pp. 1237-1248, 2000.

Rouzina, Ioulia et al., "Macroion Attraction Due to Electrostatic Correlation between Screening Counterions. 1. Mobile Surface-Adsorbed Ions and Diffuse Ion Cloud", .J. Chem. Phys., vol. 100, No. 23, pp. 9977-9989, 1996.

The Sol-Gel Gateway, "Suppliers-Colloidal solutions and nanoparticles", article from the Internet, http://www.solgel.com/precursors/sols.htm>, 3 pages, printed on Sep. 14, 2001.

Tohver, Valeria, "Nanoparticle Engineering of Complex Fluid Behavior", Langmuir, vol. 17, No. 26, pp. 8414-8421, 2001.

Tohver, Valeria, "Nanoparticle halos: A new colloid stabilization mechanism", PNAS, vol. 98, No. 16, pp. 8950-8954, 2001.

Verhaegh, Nynke et al., "Transient gelation by spinodal decomposition in colloid-polymer mixtures", Physica A, vol. 242, pp. 104-118, 1997.

Verhaegh, Nynke et al., "Transient gels in colloid-polymer mixtures studied with fluorescence confocal scanning laser microscopy", Physica A, vol. 264, pp. 64-74, 1999.

Weeks, James R., "Formation and collapse of gels of sterically stabilized colloidal particles", J Phys. Condens. Matter, vol. 12, pp. 9599-9606, 2000.

Wessling, Dr. Berhard, "Conductive Polymer / Solvent Systems: Solutions or Dispersions?", Zipperling Kessler/ Ormecon Chemie, dated 1996, article from the Internet, http://www.zipperling.de/Research/soludisp/kap13.html>, printed Sep. 14) 2 pages, printed Sep. 14, 2001.

Vincent, B. et al., "Adsorption of Small, Positive Particles onto Large, Negative Particles in the Presence of Polymer", J.C.S. Faraday I, V. 76, Iss. 3, pp. 665-673, 1980.

Luckham, P.F., et al., "The Controlled Flocculation of Particulate Dispersions Using Small Particles of Opposite Charge. III. Investigation of Floc Structure Using Rheological Techniques," Colloids and Surfaces, vol. 6, pp. 101-118, 1983.

Hawley's Condensed Chemical Dictionary, Eleventh Edition, edited by Sax and Lewis, Sr. (Van Nostrand Reinhold Company, New York, NY, copyright 1987),p. 25, (Oct. 1989).

Michna, S. et al., "Concentrated hydroxyapatite inks for direct-write assembly of 3-D periodic scaffolds", Biomaterials, vol. 26, pp. 5632-5639, (2005).

Deubel, M. et al., "Direct laser writing of three-dimensional photonic-crystal templates for telecommunications", Nature Materials, vol. 3, pp. 444-447, (2004).

Kim, I. et al., "Ultrasensitive chemiresistors based on electrospun TiO2 nanofibers", NanoLetters, vol. 6, No. 9, pp. 2009-2013, (2006).

Ding, X.-Z. et al., "Effect of tin dioxide doping on rutile phase formation in sol-gel-derived nanocrystalline titania powders", NanoStructured Materials, vol. 4, No. 6, pp. 663-668, (1994).

Chutinan, A. et al., "Highly confined waveguides and waveguide bends in three-dimensional photonic crystal", Applied Physics Letters, vol. 75, No. 24, pp. 3739-3741, (1999).

Cotton, F.A. et al., Advanced Inorganic Chemistry, Fifth Edition, ed. John Wiley & sons, pp. 215-217, pp. 781-782, 7 pages total, (1988).

ADVA® Flow Superplasticizer ASTM C494, Type F (carboxylated polyether) with Material Safety Data Sheet (MSDS), Grace Construction Products 10 p., 2002.

Campbell, et al., "Fabrication of Photonic Crystals for the Visible Spectrum by Holographic Lithography," Nature, pp. 53-56, vol. 404, 2000.

Caruso et al., "Nanoengineering of Inorganic and Hybrid Hollow Spheres by Colloidal Templating," Science, pp. 1111-1114, vol. 282, 1998.

Cassagneau et al., "Conjugated Polymer Inverse Opals for Potentiometric Biosensing," Adv. Mater., pp. 1837-1841, vol. 14, 2002.

Chen et al., "Geometric Control of Cell Life and Death," Science, pp. 1425-1428, vol. 276, 1997.

Chrisey et al., "Materials Processing: The Power of Direct Writing," Science, vol. 289, pp. 879-881, 2000.

Clark et al., "Creating Microstructures of Luminescent Organic Thin Films Using Layer-by-Layer Assembly," Adv. Mater., pp. 1031-1035, vol. 11, 1999.

Cumpston et al., "Two-Photon Polymerization Initiators for Three-Dimensional Optical Data Storage and Microfabrication," Nature, pp. 51-54, vol. 398, 1999.

Decher, "Fuzzy Nanoassemblies: Toward Layered Polymeric Multicomposites," Science, pp. 1232-1237, vol. 277, 1997.

Demers et al., "Direct Patterning of Modified Oligonucleotides on Metals and Insulators by Dip-Pen Nanolithography," Science, pp. 1836-1838, vol. 296, 2002.

Feiertag et al., "Fabrication of Photonic Crystals by Deep X-Ray Lithography," Appl. Phys. Lett., pp. 1441-1443, vol. 71, 1997.

Fery et al., "Nanoporous Thin Films Formed by Salt-Induced Structural Changes in Multilayers of Poly(acrylic Acid) and Poly(allylamine)," Langmuir, pp. 3779-3783, vol. 17, 2001.

Foresi et al., "Photonic-Bandgap Microcavities in Optical Waveguides," Nature, pp. 143-145, vol. 390, 1997.

Hadjichristidis, N., "Polymers with Complex Architecture by Living Anionic Polymerization", Chem. Rev. vol. 101, pp. 3747, 3771-3775, 2001.

Jiang et al., "Exploring the Rules for Selective Deposition: Interactions of Model Polyamines on Acid and Oligoethylene Oxide Surfaces," Langmuir, pp. 1131-1143, vol. 18, 2002.

Jiang et al., "Polymer-On-Polymer Stamping: Universal Approaches to Chemically Patterned Surfaces," Langmuir, pp. 2607-2615, vol. 18, 2002.

Kiriy et al., "Cascade of Coil-Globule Conformational Transitions of Single Flexible Polyelectrolyte Molecules in Poor Solvent," J. Am. Chem. Soc., pp. 13454-13462, vol. 124, 2002.

Laarz, E. et al., "The Effect of Anionic Polyelectrolytes on the Properties of Aqueous Silicon Nitride Suspensions", Journal of the European Ceramic Society, vol. 20, pp. 431-440, 2000.

Landers et al., "Rapid Prototyping of Scaffolds Derived from Thermoreversible Hydrogels and Tailored for Applications in Tissue Engineering," Biomaterials, pp. 4437-4447, vol. 23, 2002.

Lazaris et al., "Spider Silk Fibers Spun from Soluble Recombinant Silk Produced in Mammalian Cells," Science, pp. 472-476, vol. 295, 2002.

Lee et al., "Multi-Photon Polymerization of Waveguide Structures Within Three-Dimensional Photonic Crystals," Adv. Mater., pp. 271-274, vol. 14, 2002.

Lewis, "Direct-Write Assembly of Ceramics from Colloidal Inks," Curr. Opin. Solid State Mat. Sci., pp. 245-250, vol. 6, 2002.

Lin et al., "A Three-Dimensional Photonic Crystal Operating at Infrared Wavelengths," Nature, pp. 251-253, vol. 394, 1998.

Meier-Haack et al., "Pervaporation Separation of Water/Alcohol Mixtures Using Composite Membranes Based on Polyelectrolyte Multilayer Assemblies," J. Membr. Sci., pp. 233-243, vol. 184, 2001.

Noda et al., "Full Three-Dimensional Photonic Bandgap Crystals at Near-Infrared Wavelengths," Science, pp. 604-606, vol. 289, 2000.

Schwartz, Steven A., "Gypsum Dispersing Agents", Global Gypsum Conference, pp. 1-10, 2002.

Seidel et al., "Artificial Spinning of Spider Silk," Macromolecules, pp. 6733-6736, vol. 31, 1998.

Silkroad C&T:Admixtures for Concrete, PEMA-200N, Product Information Sheet, 2 p., 2002.

Smay et al., "Colloidal Inks for Directed Assembly of 3-D Periodic Structures," Langmuir, pp. 5429-5437, vol. 18, 2002.

Smay et al., "Directed Colloidal Assembly of 3D Periodic Structures," Adv. Mater., pp. 1279-1283, vol. 14, 2002.

Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002; (2 pages)—vol. 215, pp. 163-171, 2003.

Vlasov et al., "On-Chip Natural Assembly of Silicon Photonic Bandgap Crystals," Nature, pp. 289-293, vol. 414, 2001.

Vollrath et al., "Liquid Crystalline Spinning of Spider Silk," Nature, pp. 541-548, vol. 410, 2001.

Wu et al., "Fabrication of Complex Three-Dimensional Microchannel Systems in PDMS," J. Am. Chem. Soc., pp. 554-559, vol. 125, 2003.

Xia et al., "Soft Lithography," Angew. Chem Int. Ed., pp. 550-575, vol. 37, 1998.

Zezin et al., "A New Class of Complex Water-Soluble Polyelectrolytes," Russ. Chem. Rev., pp. 833-855, vol. 51, 1982.

Su, Ming et al., "Moving beyod Molecules: Patterning Solid-State Features via Dip-Pen Nanolithography with Sol-Based Inks", J. Am. Chem. Soc., vol. 124, No. 8, pp. 1560-1561, (2002).

Technical Bulletin: Pluronic P123 Block Copolymer Surfactant, BASF, 1 page, (2004).

Pierre, A.C., "Introduction to Sol-Gel Processing", Kluwer Academic Publishers, Boston, pp. 2-3, (1998).

Xu, P. "Polymer-ceramic nanocomposites: Ceramic phases", Encyclopedia of Materials: science and Technology, pp. 1-6, Pergamon Press, (2001).

Caracoche, et al., "Zirconium oxide structures prepared by the sol-gel route: 1, The role of the alcoholic solvent", Journal of the American Ceramics Society, vol. 83, No. 2, pp. 377-384, (2000).

* cited by examiner

DIRECTED ASSEMBLY OF THREE-DIMENSIONAL STRUCTURES WITH MICRON-SCALE FEATURES

CROSS REFERENCE TO RELATED APPLICATION

This application is a divisional application of U.S. application Ser. No. 10/463,834, filed Jun. 17, 2003, now U.S. Pat. No. 7,141,617 entitled "DIRECTED ASSEMBLY OF THREE-DIMENSIONAL STRUCTURES WITH MICRON-SCALE FEATURES".

BACKGROUND

Three-dimensional structures with micron-scale features have many potential applications, for example as photonic band gap materials, tissue engineering scaffolds, biosensors, and drug delivery systems. Consequently, several assembly techniques for fabricating complex three-dimensional structures with features smaller than 100 microns have been developed, such as microfabrication, holographic lithography, two-photon polymerization and colloidal self assembly. However, all these techniques have limitations that reduce their utility.

Two-photon polymerization is capable of creating three-dimensional structures with sub-micron features, but from precursors that are not biocompatible. Many techniques have been developed to fabricate three-dimensional photonic crystals, but they rely on expensive, complicated equipment or time-consuming procedures. Colloidal self-assembly has also been utilized to make three-dimensional periodic structures, but controlling the formation of defects is difficult.

One fabrication technique relies on the deposition of viscoelastic colloidal inks, usually by a robotic apparatus. These inks flow through a deposition nozzle because the applied pressure shears the interparticle bonds, inducing a breakdown in the elastic modulus. The modulus recovers immediately after leaving the nozzle, and the ink solidifies to maintain its shape and span unsupported regions. The particles in the ink have a mean diameter of about 1 micron, meaning that it would be impossible for the ink to flow through a 1 micron diameter deposition nozzle without clogging or jamming. In practice, nanoparticle inks (mean diameter~60 nm) also tend to jam nozzles smaller than 30 microns, limiting the applicability of viscoelastic colloidal inks to this length scale.

Polymeric solutions are used in nature to fabricate thin filaments. Spiders, for example, derive their silk fibers from a concentrated protein biopolymer solution that solidifies as it is drawn to form an extremely strong filament. The extensional flow of the solution aligns liquid crystal sheets in the polymer, and the solution gels by adding ions as it leaves the spinneret. This process was artificially recreated by the deposition of the recombinant spider silk biopolymer into a polar "deposition bath" to produce filament fibers with comparable properties.

SUMMARY

In a first aspect, the invention provides polyelectrolyte inks comprising a solvent, a cationic polyelectrolyte, dissolved in the solvent, and an anionic polyelectrolyte, dissolved in the solvent. The concentration of at least one of the polyelectrolytes in the solvent is in a semidilute regime.

In a second aspect, the invention provides a solid filament comprising a complex of a cationic polyelectrolyte and an anionic polyelectrolyte. The filament has a diameter of at most 10 microns.

In a third aspect, the invention provides a method of making a polyelectrolyte ink comprising mixing together ingredients that comprise a solvent, a cationic polyelectrolyte, and an anionic polyelectrolyte. The concentration of at least one of the polyelectrolytes in the solvent is in a semidilute regime.

In a fourth aspect, the invention provides a method for fabricating a filament, comprising flowing the polyelectrolyte ink through a nozzle, and contacting the ink with a deposition bath. The polyelectrolyte ink gels in the deposition bath.

In a fifth aspect, the invention provides a method of forming three-dimensional structure, comprising fabricating a plurality of filaments, each filament fabricated by the method set forth in the fourth aspect.

DETAILED DESCRIPTION

The present invention provides a method of microstructure fabrication via deposition of inks that flow through a deposition nozzle of 10 micron or less, without clogging or jamming. When deposited in a deposition bath the inks solidify after leaving the nozzle. The resulting microstructures have features in the micron scale and are amenable to fabrication with biocompatible materials, and are relatively easy and inexpensive to make.

The present invention includes the three-dimensional fabrication of structures with micron-scale features by making use of an ink. An applied pressure forces the ink through a deposition nozzle that is attached to a moving x-y-z micropositioner, into a deposition bath that gels the ink in situ as the micropositioner moves to form a two-dimensional pattern on the substrate. The nozzle then incrementally rises in the z (vertical) direction for the next layer of the pattern. This process is repeated until the desired three-dimensional structure has been created. With this technique, any three-dimensional structure can be defined and fabricated.

The inks of the present invention are concentrated mixtures of oppositely charged polyelectrolytes, also referred to as polyelectrolyte complexes (PEC). The PEC contains two oppositely charged polyelectrolytes (e.g. poly(acrylic acid) and poly(ethylenimine)). One polyelectrolyte is preferably larger than the other, and the concentration of the larger polyelectrolyte is preferably within the semidilute regime: the concentration is above the concentration c* that separates the dilute from the semidilute concentration regime. Below c*, in the dilute regime, the mixture of polyelectrolytes forms particles rather than the single phase fluid needed for the deposition of a continuous filament. Above c*, in the semidilute regime, polymer coils strongly overlap with each other, and the mixture of electrolytes may be used for structure deposition.

The ink viscosity is preferably in the range that allows consistent, controllable flow at a modest applied pressure. Prefer viscosity values vary between at least 0.05 Pa*sec to at most 600 Pa*sec. More preferred viscosity values are at least 0.1 Pa*sec to at most 150 Pa*sec. Yet more preferred viscosity values are at least 1 Pa*sec to at most 20 Pa*sec. Moreover, the ink undergoes a rapid solidification reaction when it comes in contact with the deposition bath that allows the extruded filament to maintain its shape while spanning unsupported regions of the structure.

Examples of polyelectrolytes that may be used in PEC are poly(acrylic acid), poly(ethylenimine), poly(styrene sulfonate) poly(allylamine) hydrochloride, poly(diallyldimethyl ammonium chloride), poly(4-vinyl pyridine), and cationic or anionic surfactants. Electrically or optically active classes of polymers, for example polyacetylene, polyaniline, polypyrrole, polythiophene, poly(3,4 ethylenedioxythiophene) (PEDOT), NAFION® (Du Pont, Wilmington, Del.), polyphenylene vinylene, polyphenylbenzenamine, sulfonated poly-p-phenylene azobenzene dye and other organic dyes may be used, and are well suited to applications involving organic LEDs and circuits. The parent polymers of some of these classes of polymers do not contain charged groups, however, copolymers and derivatives of these classes do; for example charged groups may be introduced through monomers containing substituents (which may be protected until after synthesis of the polymer), or by derivatizing reactive groups (such as hydroxyl groups, or electrophilic addition on phenyl rings).

For biochemical, molecular biological and biomedical applications, such as biocatalysis, gene manipulation and tissue engineering, biological electrolytes may be used. Example biological polyelectrolytes are polynucleotides, such as DNA and RNA, peptides, proteins, peptide nucleic acids, enzymes, polysaccharides such as starch and cellulose, acidic polysaccharides such as hemicelluloses (for example arabinoglucuronoxylan), basic polysaccharides such as poly-(1,4) N-acetyl-D-glucosamine (chitosan), galactans such as agarose, polyuronides such as alginic acid, carrageenans, hyaluronic acid, collagen, fibrin, proteoglycans, polylactic acid, polyglycolic acid, copolymers of organic acids, cationic lipids. Biological polyelectrolytes with both positive and negative charges, for instance zwitterions such as polycarboxybetaine, may also be included in the ink compositions.

Bioactive molecules may also be incorporated in the ink, for example charged or neutral nutrient molecules, molecular messengers such as growth stimulants, and cellular adhesion molecules. Molecular probes for biomolecules such as cellular lipids or cellular membrane proteins, cellular components such as ion channels and receptors, or organelles such as mitochondria or lysosomes may also be added.

Smaller organic and inorganic species can also be incorporated into the inks, to amounts that do not deleteriously affect the rheological properties of the ink. Examples include nanoparticles, quantum dots, charge neutral polymers, organometallic precursors and biomolecules. These species may interact with the polyelectrolytes to aid in the gelation or remain inert in the ink, depending on their ionic nature. Also, many other polymers may be made into polyelectrolytes through functionalizing the polymer backbone with charged moieties, for example amino groups, sulfonate groups, and carboxylic groups.

The molecular weight of the larger polyelectrolyte is preferably high enough to facilitate chain overlap (preferably at least 5000 daltons) but also low enough to form a concentrated ink with a viscosity that enables flow at moderate pressures (preferably at most 100,000 daltons). The concentration of the ink is preferably high to avoid deformation of the structures upon drying. A typical polymer concentration ranges from at least 5% to at most 95% by weight. More preferably, the concentration varies from at least 25% to at most 75% by weight. Yet more preferably, the concentration varies from at least 35% to at most 45% by weight. Most preferable concentrations range from at least 38% to at most 42% by weight.

The larger polyelectrolyte and the smaller polyelectrolyte are preferably mixed together in a ratio such that one of the charge groups is in excess (usually the charge group of the larger polymer), yielding a mixture away from a stoichiometric (1:1) cationic:anionic group ratio. In the vicinity of this ratio, the strong interactions between complementary polyelectrolytes may lead to the formation of kinetically stable, inhomogeneous aggregates, and the complex may form two phases, a polymer-rich aggregate and a polymer-poor fluid.

Once the polyelectrolytes and solvent have been chosen, a phase diagram can be developed relating the ratio of cationic to anionic groups as a function of overall polyelectrolyte concentration (in the chosen solvent), with the goal of determining the range for homogeneous inks. This range will be above the dilute/semidilute transition of the larger polymer and away from a stoichiometric (1:1) cationic:anionic group ratio. The viscosity of the homogeneous inks increases as the polymer concentration increases and as the mixing ratio approaches 1:1. The viscosity may thus be controlled for the deposition of inks through a variety of nozzle sizes.

A deposition bath is selected to fabricate three-dimensional structures through a rapid solidification reaction. In these polyelectrolyte inks, the reaction will occur by increasing the strength of the attractions between the oppositely charged polyelectrolytes. This can be achieved, for example, through pH changes, ionic strength changes, solvent composition changes, or combinations of more than one change. The reaction produces a filament that is strong enough to maintain its shape while spanning unsupported regions in the structure, but also soft enough to allow the filament to adhere to the substrate and flow through the nozzle consistently.

Deposition baths that induce gelation through pH changes are generally used when the polyelectrolytes contain acidic and/or basic charged groups. The pH change eliminates the excess of one of the charge groups, for instance by ionizing acidic groups that are neutral at the pH of the ink. This yields a mixture with a stoichiometric (1:1) cationic:anionic group ratio that gels into a filament.

In addition, the pH of the deposition bath may be selected in order to induce partial dissolution of the deposited filament, while the shape is maintained. The pH of the bath lowers the bond strength between the oppositely charged polyelectrolytes, leading to the dissolution. The structures have a residual charge on the surface, and may be used for the adsorption of charged nanoparticles.

Coagulation may also be achieved through changes in solvent composition. For example, an aqueous ink may be deposited in a deposition bath containing a relatively apolar solvent such as an alcohol. The resulting drop in dielectric constant leads to an increase in the coulombic attractions between the polyelectrolytes. Also, an apolar solvent that is a poor solvent for the polyelectrolytes may be chosen, leading to increased polyelectrolyte/polyelectrolyte bonding. The reaction yields a polyelectrolyte complex precipitate with a positive:negative charge ratio closer to 1:1 than in the unreacted ink, but not to the extent of the pH induced reaction. The structures have a residual charge on the surface, and may be used for the adsorption of oppositely charged nanoparticles.

Figure 2:
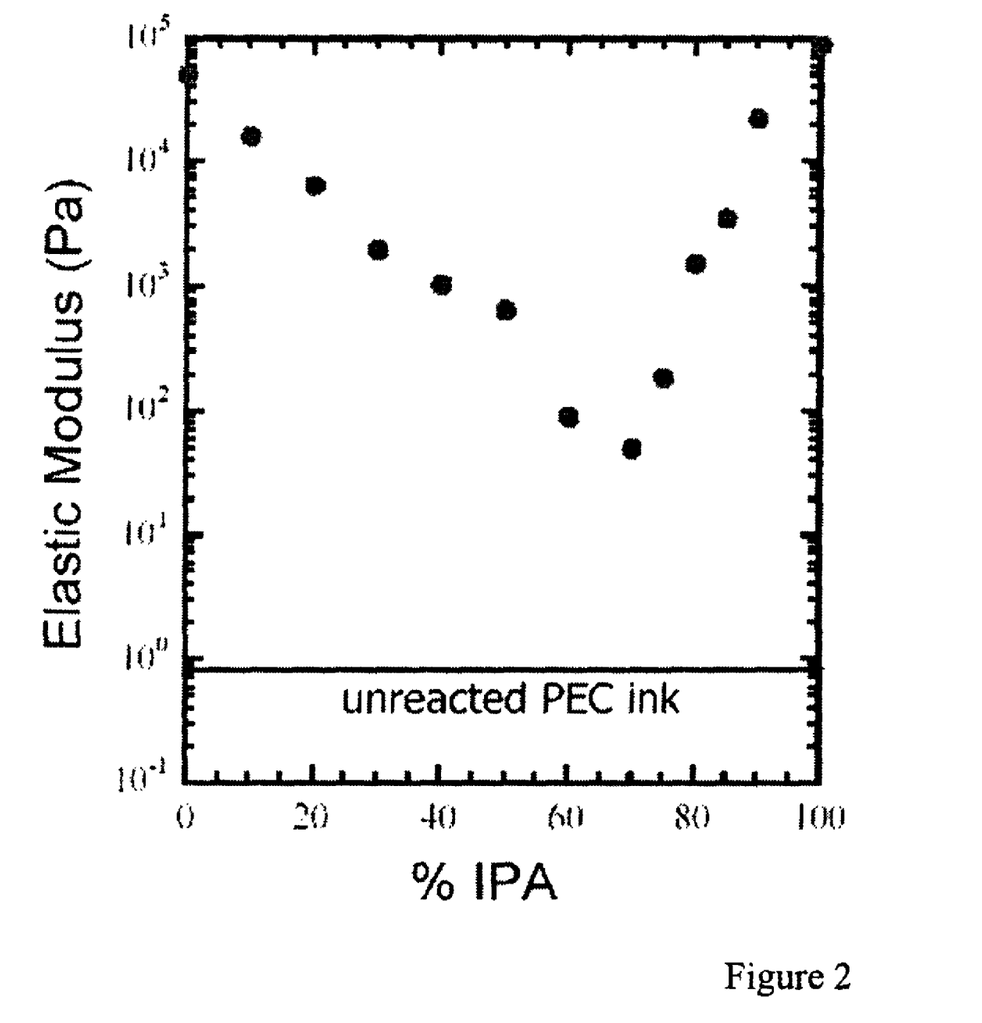
FIG. 2 shows the elastic modulus of the ink reacted in a water/IPA deposition bath as a function of IPA concentration in the deposition reservoir.

Moreover, the mechanical properties of the deposited ink are dependent on the composition of the deposition bath. As illustrated in FIG. 2, different percentages of apolar solvents generally yield filaments of varying stiffness.

An apparatus for depositing the ink may be manufactured by connecting a deposition nozzle with a diameter of preferably at least 0.1 microns to at most 10 microns to a micropositioner, for example a computer controlled piezoelectric micropositioner, and an ink reservoir. These micropositioners are used in a variety of devices, such as scanning tunneling microscopes, and are commercially available. Pressure pushes the ink through the nozzle, or two or more nozzles, and the micropositioner controls the deposition pattern of the filament. Alternatively, the nozzle (or nozzles) may be static, while the stage holding the substrate on which the microstructure is formed may be controlled by the micropositioner. In another configuration, both the nozzle and the stage may each be controlled by its own micropositioner. Multiple substrates are also possible when multiple nozzles are present. The assembly of structures is then preferably performed using patterns created in a computer aided design computer program coupled to the micropositioner.

There are many applications for solid PEC structures fabricated with these materials and methods. The structure may be infiltrated with a high refractive index material and subsequently the PEC structure redissolved to form photonic crystals. The ability of the ink to span distances renders it possible to engineer defects (for example cavities or waveguides) into the structure for functional photonic band gap materials. The highly porous structures could be used for membranes that selectively allow small molecules to flow through at a faster rate. Also, screens may be prepared that do not allow cells, or cells larger than a certain size, to flow through. Screens of this type may be used, for instance, to separate smaller cells from larger cells in a blood sample. They may also be used for drug delivery systems where a range of porosities is necessary for controlled release.

The charged complexes may be used as tissue engineering scaffolds for cell adhesion and growth. For instance, copolymers of poly(L-lactic acid) and poly(L-glycolic acid), both anionic polyelectrolytes that have been FDA approved as biodegradable polymers, may be combined with one or more cationic polymers, such as chitosan, to form a biocompatible ink for tissue engineering applications. To promote cell growth throughout the structure, proteins and sugars may be added to the ink to be released as the polyelectrolytes dissolve.

Biologically interesting molecules may also be attached to the microstructures. Examples of these molecules include nucleic acids, polypeptides and other organic molecules. Nucleic acids include polynucleotides (having at least two nucleic acids), deoxyribonucleic acid (DNA), such as expressed sequence tags (ESTs), gene fragments or complementary DNA (cDNA), or intron sequences that may affect gene transcription, such as promoters, enhancers or structural elements. However, the nucleic acid need not be related to a gene or gene expression, as aptamers (small nucleic acid sequences that specifically bind to a target molecule) can also be used. Ribonucleic acids (RNA) may also be used, such as messenger RNA (mRNA), transfer RNA (tRNA) or ribosomal RNA (rRNA). Nucleic acids may also be modified; for example, such as substituting a nucleic acid with a non-naturally occuring one, such as inosine. Chemical modifications of nucleic acids, such as those that may confer stability or facilitated immobilization upon a substrate, may also be used. Another example of a modified nucleic acid is a peptide nucleic acid (PNA), which is a nucleic acid mimic (e.g., DNA mimic) in that the deoxyribose phosphate backbone is replaced by a pseudopeptide backbone and only the four natural nucleobases are retained. The neutral backbone of PNAs allows for specific hybridization to DNA and RNA under conditions of low ionic strength. The synthesis of PNA oligomers can be performed using standard solid phase peptide synthesis protocols. Nucleic acids attached to the microstructures may be used, for example, in diagnostic and prognostic assays, gene expression arrays, pharmacogenomic assays, etc.

Polynucleotides may be linked to the microstructures through thiol-mediated self-assembly attachment to gold nanoparticles incorporated into the microstructures. The gold may be incorporated into the microstructures either by addition to the undeposited ink mixture or by attachment to the microstructures after deposition, for example via sulfhydril groups present in the ink.

Polypeptides, having at least two amino acid residues, may find use on or within the substrates of the application. Examples of classes of polypeptides include antibodies and derivatives, protein hormones (e.g., human growth hormone and insulin), extracellular matrix molecules, such as laminin, collagen or entactin; polypeptides involved in signaling, such as phosphatases and kinases; receptors, such as dopamine receptors and hormone receptors (advantageously may be attached in the native format, or in the case of homodimers, trimers, etc., mixed with other polypeptide chains or as single chains), etc. Attaching polypeptides to the substrates of the invention allow for a wide variety of applications, including drug screening, diagnostic and prognostic assays, assays that resemble enzyme-linked immunosorbent assays (ELISAs), proteomic assays and even cellular adhesion studies.

Organic molecules also find use on the microstructures. For example, steroid hormones, such as estrogen and testosterone may be attached. Such couplings facilitate for screens for molecules that bind these molecules, such as antibodies or aptamers. Likewise, candidate small molecule antagonists or agonists may be attached to facilitate pharmaceutical screening.

Entities such as prions, viruses, bacteria, and eukaryotic cells may also be attached. Prions are misfolded protein aggregates that can propagate their misfolded state onto native proteins; examples include those aggregates that cause mad cow disease (bovine spongiform encephalopathy (BSE)) or Creutzfeldt-Jacob disease. Examples of viruses include herpes simplex, orthopoxviruses (smallpox) or human immunodeficiency virus. Bacteria that are of interest may include *Vibrio cholera, Clostridium perfringens*, or *Bacillus anthracis* (anthrax). Eukaryotic cells, such as those isolated as primary cultures from subjects or plants, or from cell lines (e.g., those available from the American Type Culture Collection (ATCC); Manassus, Va.), may be immobilized onto the microstructures for a variety of purposes, including screens for pharmaceuticals, investigations into cell-substrate adhesion, or for the binding of various molecules.

Any ink that gels through a solvent change may be used to assemble three-dimensional structures from electrically, optically or biologically active polymers. Inorganic structures may also be fabricated by using sol-gel precursors to produce, for example, sensors or template-free photonic band gap materials.

EXAMPLES

1) Ink Mixtures

A linear polyacid, poly(acrylic acid) (MW~10,000) and a highly branched polybase, poly(ethylenimine) were combined in an aqueous solvent, yielding solutions with a polymer fraction $\Phi_{poly}$=0.4. When these polyions were combined, the carboxylate groups of poly(acrylic acid) (PAA) form ionic bonds to the amine groups of poly(ethylenimine) (PEI). The polymers were initially mixed under mildly acidic conditions (pH~3.6), where the partial charge on the PAA let only a fraction of the potentially ionizable groups participate in complexation. The $\Phi_{poly}$ was maintained constant, and different PAA to PEI ratios yielded mixtures with varying rheological properties, as illustrated in the phase diagram of FIG. 1. In this figure, the values on the left and the right y-axes indicate values for pure PAA and pure PEI at $\Phi_{poly}$=0.4 The dilute-semidilute crossover concentration c* for PAA is indicated on the bottom x-axis. The two-phase region consists of a dense, polymer-rich phase, and a fluid-like, polymer-poor phase, and data could not be obtained in this regime. As the ratio approaches the two-phase region, the elastic modulus and the viscosity of the mixtures increases.

Figure 1:
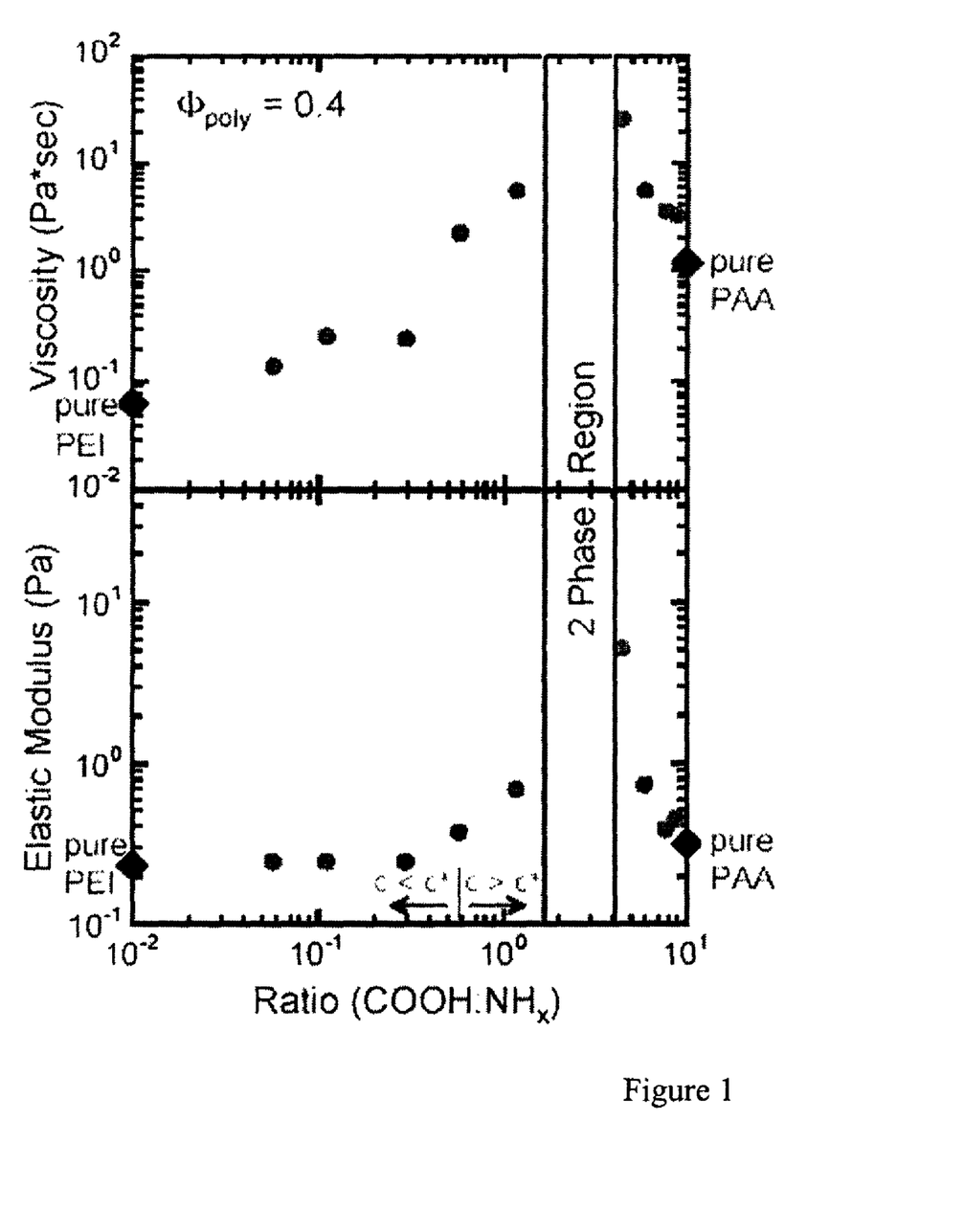
FIG. 1 shows viscosity and elastic modulus of polyelectrolyte mixtures as a function of the mixing ratio of ionizable groups at a constant polymer volume fraction ($\Phi_{poly}=0.4$).

A homogeneous, single phase was observed at mixing ratios in the PAA and PEI rich regions. The charge imbalance forms a non-stoichiometric, hydrophilic complex. The two-phase region, near stoichiometric mixing ratios, comprises a dense, polymer-rich phase with a stoichiometric, hydrophobic complex and a fluid-like, polymer-poor phase.

The viscosity differences observed at different mixing ratios may be utilized to assemble structures at different length scales. At small nozzle sizes, a lower viscosity ink may be deposited at modest applied pressures, whereas larger nozzle sizes generally require more viscous inks in order to obtain flows with controlled rates.

2) Ink Deposition Apparatus

Inks prepared as described in example 1 were loaded in a deposition apparatus for microstructure fabrication. The apparatus comprised a NanoCube™ XYZ NanoPositioning System (Polytec PI, Auburn, Mass.) controlling μ-Tip (World Precision Instruments, Sarasota, Fla.) deposition nozzles, and the ink was dispensed from the apparatus by a Model 800 ULTRA Dispensing System with a 3 ml ULTRA Barrel Reservoirs (EFD, Providence, R.I.).

3) Fabrication of Structures in an Isopropanol and Water

An ink prepared according to the procedure of example 1, with a $\Phi_{poly}$=0.4, a PAA:PEI ratio of ~5.7:1, was deposited, at a velocity of 20 microns/second and through a 1 micron nozzle, in a deposition bath containing a mixture of isopropanol (IPA) and water. The gelation occurs due to a decrease in solvent quality for the polyelectrolytes and an increase in the coulombic attractions between the ionizable groups, yielding a reacted ink filament. NMR spectroscopic data (not shown) showed no discernable difference in the types of bonds in the reacted and unreacted complexes, indicating that the reaction only causes a change in the number and strength of the bonds. The mechanical properties of the reacted ink were highly dependent on the deposition bath, as illustrated in FIG. 2.

4) Fabrication of Structures in a Water Deposition Bath

The experiment of Example 3 was repeated, this time using an ink with a PAA:PEI ratio of ~4.8 and a deposition bath of deionized water. The pH change eliminated the excess of the groups bearing a positive charge by ionizing acidic groups that were neutral at the pH of the ink. This yielded a mixture with a nearly stoichiometric cationic:anionic group ratio that gelled into a filament (Table 1).

TABLE 1

| Polyelectrolyte | Carbon | Hydrogen | Nitrogen | (−:+) charge ratio |
|---|---|---|---|---|
| PAA | 39.48 | 4.80 | | NA |
| PEI | 52.04 | 11.78 | 31.68 | NA |
| Unreacted PEC | 40.12 | 5.21 | 2.27 | 4.8:1 |
| Reacted PEC | 41.92 | 5.58 | 2.90 | 1.1:1 |

4) Microstructures

Figure 3A:
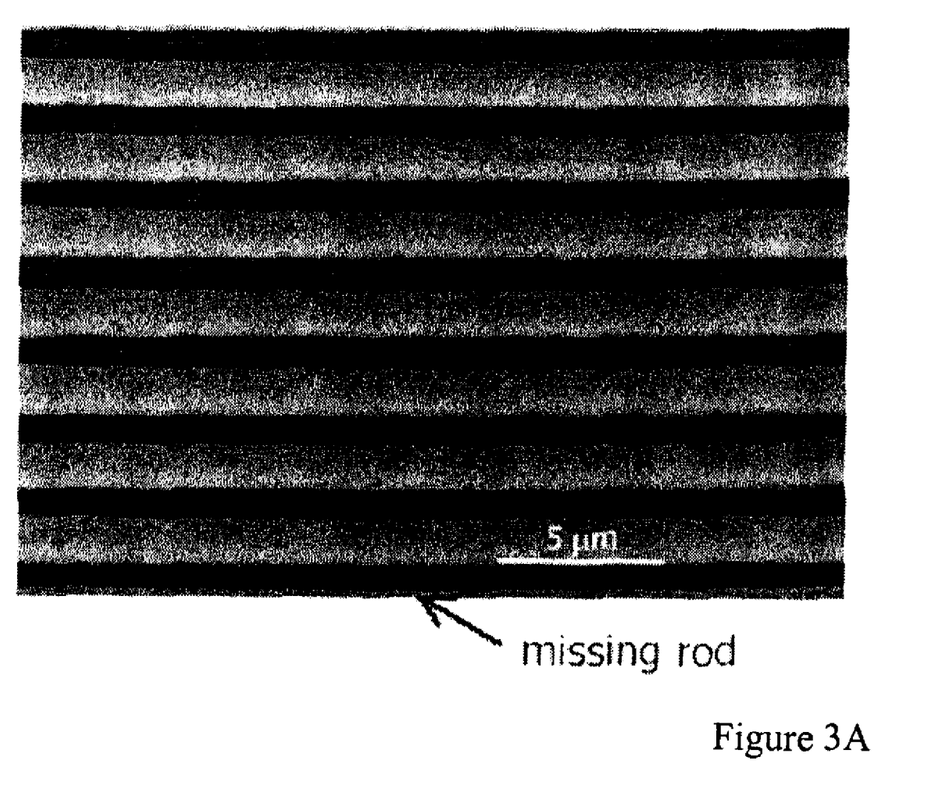
FIGS. 3A, 3B and 3C are electron micrographs of structures fabricated through the directed assembly of polyelectrolyte inks. (A) Four-layer micristructure with a missing rod that may be utilized as a waveguide in a photonic crystal. (B) Eight-layer structure with walls showing the ink's ability to form spanning and space-filling elements. (C) Radial structure showing the inks ability to turn sharp and broad angles.
Figure 3B:
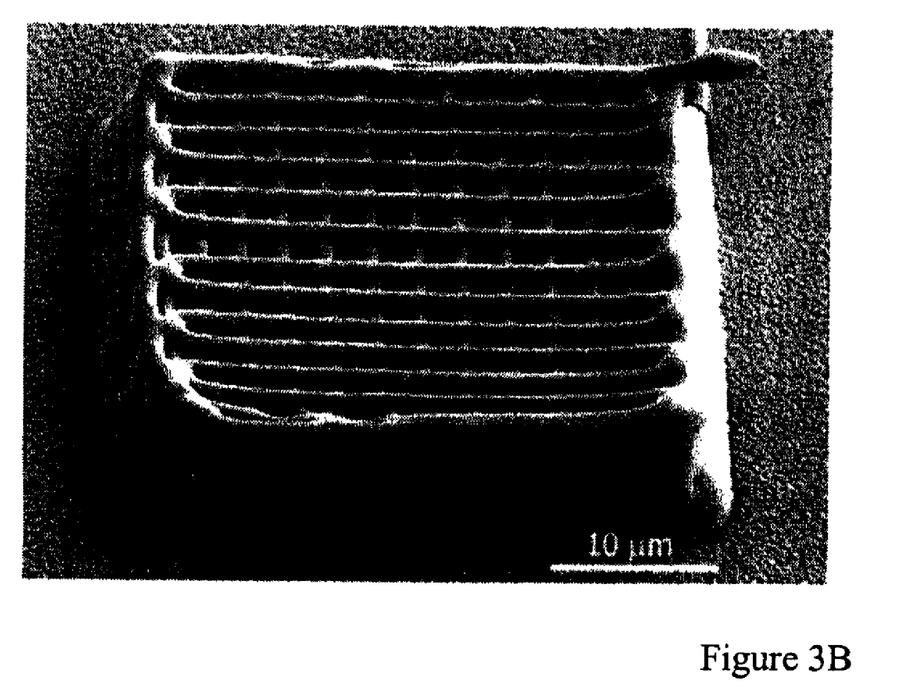
Figure 3C:
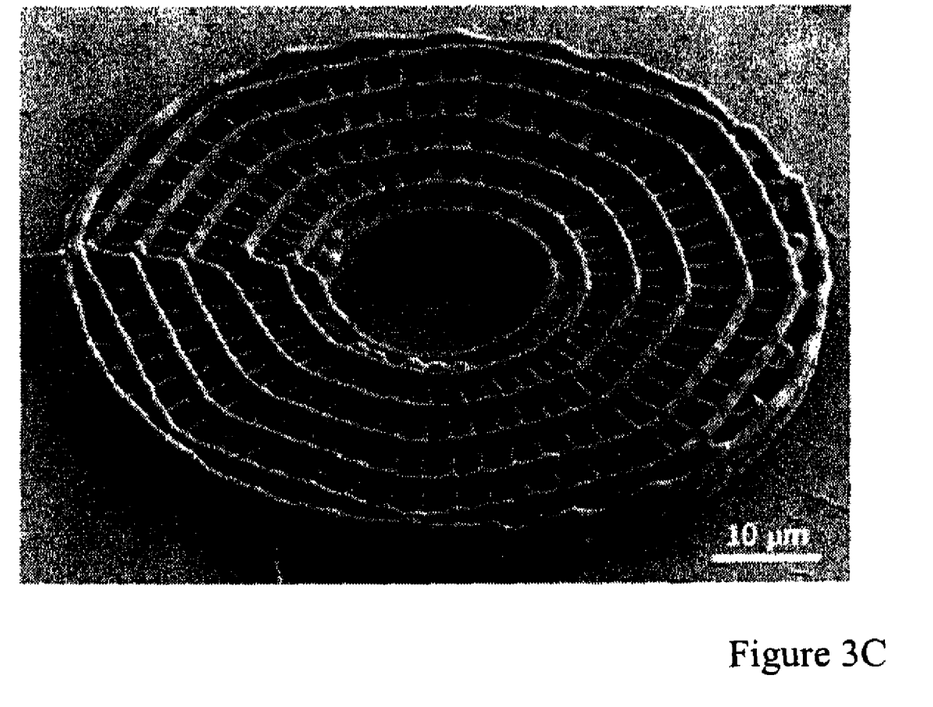

FIGS. 3A to 3C show structures fabricated with a 1 micrometer nozzle in an 83% IPA (balance water) deposition bath. FIG. 3A shows an FCT structure with a missing filament in the middle that could be used as a waveguide in a photonic crystal. FIG. 3B shows an 8-layer structure with walls, showing the ability to form solid structures as well as spanning elements. FIG. 3C shows a radial structure with porosity at multiple length scales. The reacted complex is capable of spanning lengths much greater than the filament diameter. Waveguides and radial structures were fabricated, showing the ability to fabricate structural features with tight or broad angles. Periodic structures with different feature sizes were also fabricated, wherein the feature size of a structure is the diameter of its thinnest filament, obtained with different nozzles and inks ($\Phi_{poly}$=0.4 and PAA:PEI ratio~5.7:1; $\Phi_{poly}$=0.4 and PAA:PEI ratio~5:1; $\Phi_{poly}$=0.43 and PAA:PEI ratio~2:1).

If the deposition occurs in a slightly acidic reservoir, partial dissolution of the complex occurs, while the shape is maintained, leading to highly porous structures with lower elasticity. The structures have a residual negative charge on the surface, and may be used for the adsorption of nanoparticles.

The microstructures may also undergo thermal treatment and maintain their integrity. For example, the microstructures were heated at 5° C./min to 240° C. in air. The temperature was held at 240° C. for 30 minutes, and then cooled at 5° C./min. The structures maintained their original shape and became harder than prior to the heating. This hardening may be due also to heat-induced inter-polyelectrolyte bond formation, for example amide bonds formed between the carboxyl groups of the PAA and the amine groups in the PEI.

The invention claimed is:

1. A solid extruded filament, comprising a complex of a cationic polyelectrolyte and an anionic polyelectrolyte, wherein the extruded filament has a diameter of at most 10 microns and comprises an elastic modulus of between about $10^2$ Pa and about $10^5$ Pa.

2. The solid extruded filament of claim 1, wherein the extruded filament has a diameter of at most 1 micron.

3. The solid extruded filament of claim 2, wherein the polyelectrolytes are selected from the group consisting of poly(acrylic acid), poly(ethylenimine), poly(styrene sulfonate) poly(allylamine)hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene)carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

4. The solid extruded filament of claim 2, wherein the cationic polyelectrolyte is poly(ethylenimine), and the anionic polyelectrolyte is poly(acrylic acid).

5. The solid extruded filament of claim 1, wherein the polyelectrolytes are selected from the group consisting of poly(acrylic acid), poly(ethylenimine), poly(styrene sulfonate) poly(allylamine)hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene)carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

6. The solid extruded filament of claim 1, wherein the cationic polyelectrolyte is poly(ethylenimine), and the anionic polyelectrolyte is poly(acrylic acid).

7. The solid extruded filament of claim 1, wherein the extruded filament is produced by:
flowing a polyelectrolyte ink, comprising a solvent, a cationic polyelectrolyte dissolved in the solvent, and an anionic polyelectrolyte dissolved in the solvent, wherein a concentration of at least one of the polyelectrolytes in the solvent is in a semidilute regime, through a nozzle; and
contacting the ink with a deposition bath;
wherein the polyelectrolyte ink gels in the deposition bath.

8. The solid extruded filament of claim 7, wherein the extruded filament has a diameter of at most 1 micron.

9. The solid extruded filament of claim 7, wherein the polyelectrolytes are selected from the group consisting of poly(acrylic acid), poly(ethylenimine), poly(styrene sulfonate) poly(allylamine) hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene) carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

10. The solid extruded filament of claim 7, wherein the cationic polyelectrolyte is poly(ethylenimine), and the anionic polyelectrolyte is poly(acrylic acid).

11. The solid extruded filament of claim 7, wherein the deposition bath has a pH different than a pH of the ink.

12. The solid extruded filament of claim 7, wherein the deposition bath has an ionic strength different than an ionic strength of the ink.

13. The solid extruded filament of claim 7, wherein the deposition bath comprises a solvent different than the solvent in the ink.

14. The solid extruded filament of claim 7, wherein the deposition bath comprises alcohol.

15. The solid extruded filament of claim 1, wherein the extruded filament is formed by a rapid solidification reaction.

16. The solid extruded filament of claim 15, wherein the polyelectrolytes are selected from the group consisting of poly(acrylic acid), poly(ethylenimine), poly(styrene sulfonate) poly(allylamine) hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene) carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

17. The solid extruded filament of claim 15, wherein the cationic polyelectrolyte is poly(ethylenimine), and the anionic polyelectrolyte is poly(acrylic acid).

18. A three-dimensional structure having micron-scale features assembled from one or more solid extruded filaments, wherein the solid extruded filaments each comprise a complex of a cationic polyelectrolyte and an anionic polyelectrolyte, and the extruded filaments have a diameter of at most 10 microns and an elastic modulus of between about $10^2$ Pa and about $10^5$ Pa.

19. The three-dimensional structure of claim 18, wherein the extruded filaments have a diameter of at most 1 micron.

20. The three-dimensional structure of claim 19, wherein the polyelectrolytes are selected from the group consisting of poly(acrylic acid), poly(ethylenimine), poly(styrene sulfonate) poly(allylamine) hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene) carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

21. The three-dimensional structure of claim 19, wherein the cationic polyelectrolyte is poly(ethylenimine), and the anionic polyelectrolyte is poly(acrylic acid).

22. The three-dimensional structure of claim 18, wherein the polyelectrolytes are selected from the group consisting of poly(acrylic acid), poly(ethylenimine), poly(styrene sulfonate) poly(allylamine) hydrochloride, poly(diallyldimethyl ammonium chloride), poly(4-vinyl pyridine), polyacetylene, polyaniline, polypyrrole, polythiophene, poly(3,4 ethylenedioxythiophene), poly(tetrafluoroethylene) carboxylate, poly(tetrafluoroethylene) phosphonate, polyphenylene vinylene, phenylbenzenamine, sulfonated poly-p-phenylene azobenzene, polynucleotides, peptides, proteins, peptide nucleic acids, enzymes, polysaccharides, starch, cellulose, acidic polysaccharides, hemicelluloses, arabinoglucuronoxylan, basic polysaccharides, poly-(1,4) N-acetyl-D-glucosamine, galactans, agarose, polyuronides, alginic acid, carrageenans, hyaluronic acid, collagen, fibrin, proteoglycans, polylactic acid, polyglycolic acid, copolymers of organic acids, cationic lipids, zwitterionic polyelectrolytes, polycarboxybetaine.

23. The three-dimensional structure of claim 18, wherein the cationic polyelectrolyte is poly(ethylenimine), and the anionic polyelectrolyte is poly(acrylic acid).

* * * * *